United States Patent Office 3,274,546
Patented Sept. 20, 1966

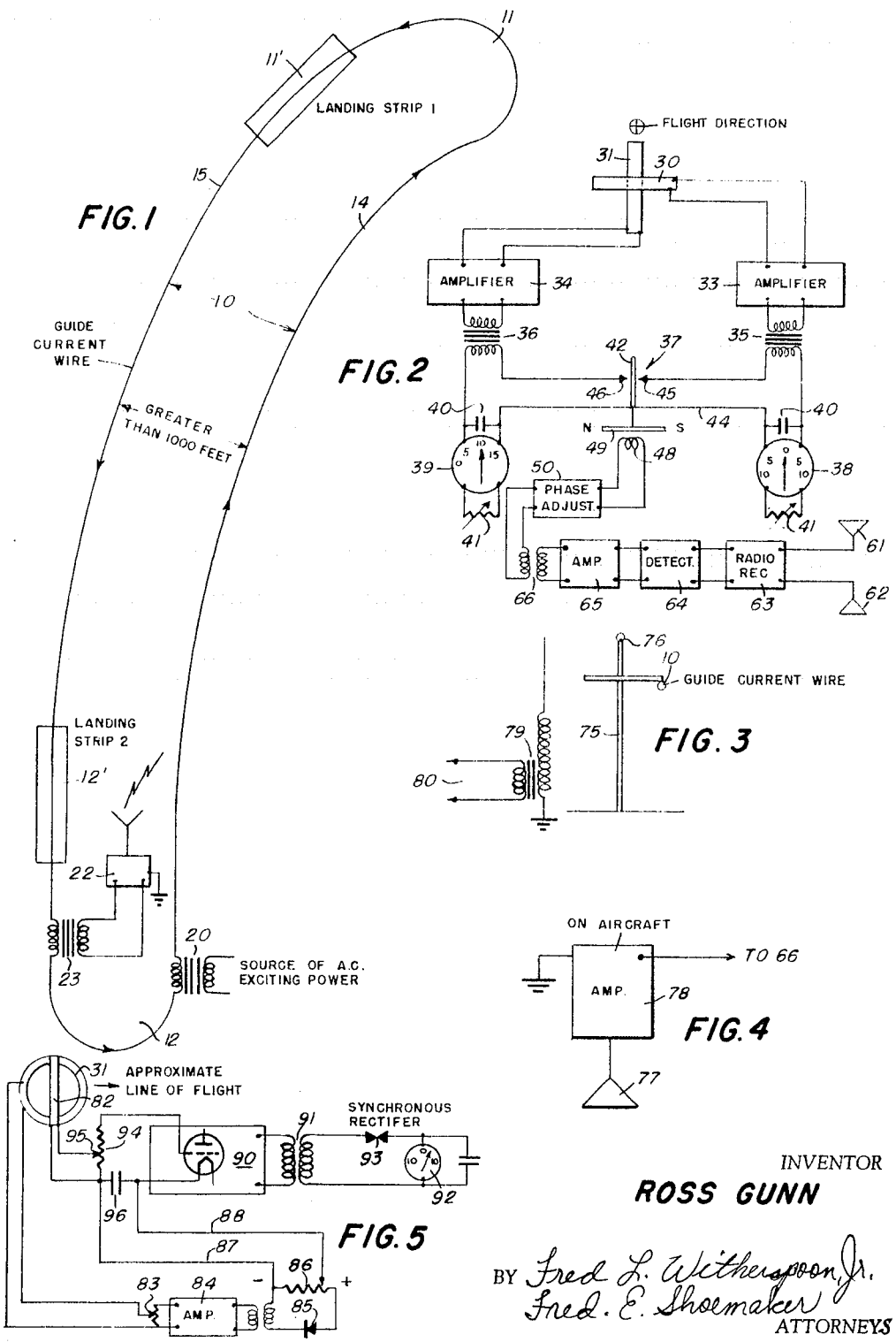

3,274,546
AIRCRAFT GUIDANCE, APPROACH, AND LANDING SYSTEM WITH YAW DETECTION AND METERING
Ross Gunn, 4437 Lowell St. NW., Washington, D.C.
Original application Apr. 29, 1959, Ser. No. 809,861, now Patent No. 3,116,473, dated Dec. 31, 1963. Divided and this application Oct. 30, 1963, Ser. No. 320,113
6 Claims. (Cl. 340—25)

This application is a division of application Serial No. 809,861, filed April 29, 1959, now Patent No. 3,116,473.

This invention relates to guidance, approach, and landing systems, primarily intended for, but not restricted to use with aircraft, and more particularly to such systems making use of closed loop, alternating-current-excited conduction systems for height and directional guidance in cooperation with aircraft carried position detection and indication systems and incorporating yaw detection and metering.

It is a general object of the present invention to provide novel and improved aircraft guidance systems of great simplicity and reliability, low cost, high degree of accuracy, and capable of operation with a minimum of attention by the pilot.

More particularly, it is an object of one phase of the present invention to provide a closed A.C.-energized guidance system for two-way aircraft operation, making use of signals from one side of the loop for guidance in one direction and from the other well-spaced-away side for guidance in the other, means independent of the degree of visibility being provided for ready ascertainment of correct direction of flight over either loop side.

In another phase of the system, it is an object to provide aircraft carried instruments, cooperating with the signals from an energized guide loop system on the ground or with the signals from an energized, concentrated conductor using a dispersed return conduction system, for detecting and metering yaw for both direction and degree whereby proper corrective measures may be taken, just prior to landing to correct the yaw for aircraft set-down aligned with the axis of the landing strip.

For use with both phases of the system referred to above, it is an object to provide an additional, optional means for transmitting a synchronizing signal, making use of electrostatic induction from a conductor paralleling the main signal or guide conductor, energized at a high voltage usually in respect to ground at the same frequency and having a fixed phase relation to the current in the guide conductor and picked up on the aircraft by an antenna, amplified and used for synchronizing an instrument actuating rectifier system thereon in a manner not capable of radio jamming.

An important object of the invention resides in the arrangement on the aircraft of two signal detecting coils, one mounted with its axis transverse to the flight axis and thus responsive to the component of the guide conductor field which is horizontal and perpendicular to the normal flight axis of the aircraft, and the second being arranged to respond to the component of the guide conductor field which is parallel to the fore and aft axis of the craft, with means associating the outputs of the two coils to sense yawing in direction and degree.

Still another object of the invention resides in an arrangement whereby the yaw measuring means is dependent only on the angle of yaw and not on the intensity of the magnetic field inducing the voltage in the yaw responsive coil, whereby the effectiveness of the system is independent of the distance (within limits) of the aircraft from the guide conductor.

Other and further objects and specific features of the invention will be more apparent to those skilled in the art upon a consideration of the following specification and accompanying drawing wherein are disclosed several exemplary embodiments of the invention with the understanding that such changes and modifications may be made therein as fall within the scope of the appended claims without departing from the spirit of the invention.

In said drawings:

FIGURE 1 is a diagrammatic and schematic showing of the ground installation of a closed loop guidance, approach, and landing system illustrating one method of synchronizing craft carried instrumentation for advising the course, location, elevation, etc.;

FIGURE 2 illustrates craftborne apparatus for normal guidance and landing operations;

FIGURE 3 is a schematic showing of one method of mounting the guide conductor and an auxiliary conductor for synchronization by means of electrostatic induction;

FIGURE 4 is a diagrammatic showing of craftborne equipment for use with the electrostatic synchronization system of FIGURE 3; and FIGURE 5 is a diagrammatic showing of the circuits aboard the craft for determining and indicating or metering yaw.

In that system are disclosed two induction coils mounted on the craft to work in conjunction with signals from the energized conductor and synchronizing signals to provide accurate data to guide an airplane to a perfect landing. The two mutually perpendicular magnetic induction coils have, respectively, such orientation as to present one axis horizontal and transverse to the line of flight, and one vertical or normal to the ground, thus responding respectively to a component of the excited conductor field which is horizontal and perpendicular to the normal axis of flight of the craft, and to one which is vertical and perpendicular to the axis of symmetry (fore and aft axis of the airplane).

These coils work satisfactorily where the aircraft axis and the flight direction are identical and in conjunction with appropriate meters enable the pilot to follow directly above the guidance conductor to determine his height above the conductor whereby safe landings may be made under condition of poor or non-existent visibility; however, if due to strong cross winds the plane is caused to yaw, the response of one of these coils may change appreciably; and moreover, it is desirable to know the direction and degree of yaw in order to eliminate it by proper use of the rudder just before touchdown, for otherwise the craft will instantly run off the landing strip laterally.

For the purpose of detecting the presence of yaw and determining its extent and direction, a third coil whose axis is perpendicular to each of the two mentioned above may be provided. Its response axis is fore and aft and hence at right angles to all electromagnetic fields from the guide conductor if the aircraft has its flight axis substantially parallel to the conductor. When yaw occurs, however, this coil will sense a magnetic field because the flight axis presumably parallel to the conductor, and the aircraft axis make an angle to each other. The magnitude of the voltage induced in this third coil depends not only on its distance from the guide conductor and the current in the conductor, but on the sine of the angle of yaw. Moreover, it may be demonstrated experimentally that the phase of the induced voltage in the coil reverses whenever the angle of yaw reverses.

Referring now to the drawings and first to FIGURE 1 there is shown an arrangement of guide conductor 10 in the form of a loop which may extend from city 11 to city 12 with the sides 14 and 15 thereof spaced on the order of a thousand feet apart, whereby separate guide paths are provided for incoming and outgoing traffic at each landing strip 11′ and 12′, crafts travelling in opposite directions being maintained at a safe lateral spacing by the rotary traffic.

It is contemplated the closed loop may be used with cities as far apart as 100 miles, but in cases where the distance is greater or the intermediate terrain undesirable for positioning the guide conductors, a closed loop may be provided at each end adjacent the landing strip, in which event, intermediate portions of the side conductors 14 and 15 may be eliminated. This provides for adequate guidance for approaching both landing strips and insures the proper rotary operation of traffic.

The conductor loop is energized with an A.C. current of constant and known magnitude for signalling aircraft through a transformer 20 energized by a suitable source of A.C. power having a frequency usually within the audio range. If the loop is divided into two parts by shorting conductors as noted above, a separate transformer for exciting the upper section, a substantial duplicate of that shown at 20, will be required.

For providing a synchronizing signal for use aboard the aircraft, a radio transmitter such as indicated at 22 may be located anywhere along the loop length and has its signal modulated by transformer 23 whose primary is excited, for example, by a transformer in series with the guide conductor loop and, hence, provides the same frequency modulation as the magnetic field energy given off electromagnetically by the alternating current. Other methods of coupling to the modulator of the radio transmitter are acceptable. In the event that the distance between landing strips is too great for reliability to be placed on a single transmitter at one end of the loop, a second one may be provided adjacent the opposite end and similarly excited.

For guidance, elevation information, and landing, as described in the previously-identified pending application, each aircraft may be equipped with apparatus as indicated in FIGURE 2 where two independent perpendicularly arranged sensing or pick-up coils of many turns of small wire are oriented to lie, one, numbered 30, in a horizontal plane with its axis vertical so as to be responsive to the vertical component of the varying magnetic field established by the current in the guide conductor, while the second, numbered 31, is responsive to the horizontal component of the field and has its axis horizontal and perpendicular to the fore and aft axis of the craft.

Under adverse conditions these coils should be maintained substantially in their original horizontal and vertical orientation by the use of gimbals, gyroscopic controls, or other means so that even though the vehicle tips to relatively large angles, they will remain essentially in their respective horizontal and fore and aft vertical planes for proper cooperation with magnetic signals from the guide conductor. The relatively small A.C. voltage induced in the coils may be amplified as by known type amplifiers 33 and 34, respectively, and their outputs are, via transformers 35 and 36, connected respectively to a center zero direct current meter 38 and a conventionally scaled direct current meter 39, each shunted by an appropriate condenser 40 and sensitivity adjuster 41. The outputs from the two amplifiers are rectified before being supplied to the meters 38 and 39 by a single rectifier 37 including a vibrating reed 42 connected to the common conductor 44 between the secondaries of transformers 35 and 36, via the meters and their shunting condensers 40 and is oscillatable between stationary contacts 45 and 46 connected respectively to the other side of each meter and condenser via the transformer secondaries.

The reed 42, which acts in conjunction with contacts 45 and 46 are rectifying the outputs of amplifiers 33 and 34 in order that direct current meters may be used, is vibrated by polarized relay mechanism including a coil 48 energized from phase adjuster 50 and permanent magnet 49 which may or may not be secured to the reed.

Operating energy for the coil 48 comes from radio receiver 63 energized by antenna 61 and counterpoise 62 carried by the craft. This delivers to detector 64 and amplifier 65, energizing the phase adjuster through transformer 66. Energy in coil 48 vibrates reed 42 causing synchronous and individual rectification of the outputs of amplifiers 33 and 34. The phase adjuster must be carefully manipulated, in the original setting of the apparatus, to insure synchronism, for the radio signal provides a reference frequency on the aircraft which is exactly the same as that used to excite the guide conductor and must bear a fixed phase relation to it so that the rectifier contacts may be caused to open and close in synchronism with the exciting current in the cable and thus the relatively weak voltages induced in coils 30 and 31 may be rectified and their magnitudes and the phase of the current in coil 30 read on the meters 38 and 39 thus making it a simple matter to find the guide conductor and to detect its influence at relatively high altitudes under constant conditions of excitation.

As pointed out in the earlier application, the polarized relay as a rectifier is subject to certain ills, and circuits without moving contacts are frequently desired. For this purpose the well-known synchronous detector amplifier may be used to accomplish the same results and the outputs from such circuits will operate direct current meters, giving readings that are proportional to the alternating voltages applied and will reverse the readings of the direct current meter connected to coil 30 when phase reversal occurs. This arrangement is shown in FIGURE 4 of the co-pending application previously identified.

Other specialized circuits for accomplishing the same objective may be found in electronic literature.

In the prior application two methods of providing a synchronizing signal for actuating the rectifiers were disclosed—the first being an amplified signal from coil 31 responsive to the guide conductor pulses, for, as long as the craft is travelling in the same direction, this signal does not change phase. However, it is commonly of less intensity than the radio signal defined above and forming the second method for synchronization. Obviously the radio method is superior because it permits operation at greater distances from the conductor, simplifying the problem of locating it in overcast weather. Moreover, the radio signal does not change phase when the direction of the craft in respect to the guide wire is reversed, but the signal received by coil 31 does change phase under the same circumstances; and if this signal is used also for operating a synchronous rectifier, it is not possible to tell in which direction the craft is moving in respect to the guide conductor. With radio, however, this can be done simply by deviating the craft from the plane of the conductor and noting whether the meter 38 indicates deviation in the direction in which the craft is deviating or oppositely. Signals from the coil 31, as pointed out in the earlier application, are varied in intensity almost exactly in inverse proportion to the height of the craft above the guide conductor, and this height can be read on a carefully graduated instrument such as 39, which can also be useful in enabling a determination of the direction of the craft along the guide wire.

A third method, to be used in addition to the magnetic and radio systems already described for maintaining synchronism for the rectifiers, is illustrated in FIGURES 3 and 4, and this system employs electrostatic induction.

The third method involves the use of a second unshielded wire paralleling and somewhat remote from the guide current wire in, for instance, an arrangement such as shown in FIGURE 3 where a pole 75 carries the guide current wire 10 at one end of a crossarm and at a reasonable distance above the ground, and a second wire 76 is supported at the top of the pole more or less parallel to the guide conductor; and this second wire is maintained at a high alternating current voltage usually with respect to ground by transformer 79 powered from source 80, as in FIGURE 3, at the same frequency as the current in 10. Its frequency is identical with that current, and the phase has a fixed relationship to the current in the guide conductor.

If an aircraft is within fifteen hundred to twenty-five hundred feet of this high voltage wire or nearer, a small antenna such as illustrated at 77 in FIGURE 4, on the aircraft, will have a small voltage induced in it whose frequency is exactly the same as that of the high voltage, which, in turn is identical with the frequency of the current in the guide conductor. If this small signal is passed through amplifier 78, an alternating current voltage may be secured on the aircraft that has all of the required characteristics to operate the synchronous rectifier, a locked-in amplifier, or a synchronous detector if introduced into transformer 66 of FIGURE 2.

For certain reasons the electrostatic induction method of providing a synchronizing signal on the aircraft is not as useful as the radio method and may be more expensive, for it cannot operate with a buried conductor because the conducting earth would shield the electrostatic field from the aircraft. Electrostatic synchronization could be very useful if a landing area were subject to radio jamming of accidental or intentional origin and radio circuits could not be used.

The apparatus defined above comprising the oriented magnetic induction coils mounted on the aircraft and working in conjunction with an excited guidance conductor on the ground provides accurate data to guide the airplane to a perfect landing. For the purpose of the above-described features of the invention, the induction coils on the aircraft were defined as air core inductors wound on a frame defining a plane perpendicular to the axis of maximum response to the magnetic field, but for those phases of the invention and the one about to be described, it has been found that such coils could be of wire wound on a thin magnetic alloy core, like annealed Permalloy or Allegheny Ludlum 4750 alloy. The direction of maximum response is in this case the direction of orientation of the straight core axis. Either type of coil is wound with many turns of wire and is designed to be responsive to small alternating magnetic fields as previously explained.

For yaw measuring, two pick-up coils are desirable, and one is mounted on the aircraft in such a way as to respond to the components of the excited conductor field which are horizontal and perpendicular to the normal flight axis of the airplane. As seen in FIGURE 5, this coil is numbered 31 since it may be one of the coils bearing that number used in the apparatus of FIGURE 2, in order to prevent duplication. The other coil 82 is arranged with its axis of response parallel to the fore and aft axis of the airplane and is preferably also stabilized by gimbals or a small gyroscope so that it responds to the components of the impressed magnetic field which are parallel to the axis of symmetry of the craft in spite of the attitude thereof. Thus since the magnetic field of the guide conductor is always at right angles to the conducting axis, there will be no electromotive forces induced in coil 82 if the direction of maximum magnetic field response of the coil is parallel to the fore and aft axis of the airplane when the aircraft axis and the flight axis are identical or parallel, and in the plane of the conductor.

However, if the airplane yaws due to a cross wind, for example, coil 82 will sense a magnetic field because the flight axis and the aircraft axis make an angle with each other. An examination of the basic physics shows that the magnitude of the voltage induced in the coil depends inversely on the distance of the coil from the guide conductor, the current in the latter, and on the sine of the angle of yaw. Clearly the phase of the induced voltage reverses whenever the angle of yaw reverses.

As shown in FIGURE 5, coil 31 is connected through a potentiometer 83 to amplifier 84, the output of which is fed through a transformer to any type of rectifier 85, the output of which is regulated by potentiometer 86, it being noted that the rectifier is poled to provide a negative potential on conductor 87 and positive on conductor 88.

Coil 82 has its output fed to the grid and filament of the first tube of an amplifier 90, as shown, by way of potentiometer 94 and condenser 96, and the output of the amplifier passing through transformer 91 is fed to a center-zero direct-current meter by way of a synchronous rectifier 93, rectification being achieved and synchronized as previously defined by means of a signal having the same frequency and phase as that of the guide conductor.

Since coil 82 is responsive to the longitudinal components of the magnetic field with respect to the axis of symmetry of the plane and will reverse its sine as the angle of yaw is reversed, it is operated in conjunction with the synchronous rectifier and will serve as the most useful yaw indicator. If it is desired to modify the yaw indicator to provide an angular measure of yaw, certain refinements are required to compensate for the difference in the magnitude of the signal induced in the sensing coil resulting from different altitudes of the landing aircraft and, hence, different intensities of field.

In general, a yaw meter is required on an aircraft only when the latter contemplates contact with the ground, i.e., during the later stages of the approach, and the signal introduced into the yaw coil by the A.C. magnetic field of the cable will normally vary by a factor of approximately 5 when the aircraft drops from 200 feet, say, down to ground contact. Only over this limited range is it required to make the yaw meter readings dependent only on the angle of yaw and not on the intensity of the magnetic field inducing a voltage in the coil. This is where the secondary sensing coil 31 and its amplifying system, already described above, comes into operation to provide a signal which, interacting with the signal from the yaw-sensing coil, is arranged to compensate for the increased signal resulting from decreasing altitudes of the aircraft. In other words, the coil which is responsive to the horizontal transverse component of the magnetic field is used, to provide a voltage that increases with decreasing altitude, in such a way as to compensate for the increase in signal from the yaw-sensing induction coil. The circuits shown are more or less equivalent to an automatic volume control system, employing vacuum tubes or transistors to perform the requisite control. As shown, the output from rectifier 85 is fed to the filament and grid of the first tube in amplifier 90, the negative lead 87 through voltage divider 94 along which a slider 95 connected to coil 82 moves. Thus, the output from rectifier 85 changes the effective amplification of the tube as the altitude of the aircraft varies. The closer the craft to the guide conductor, the more effective the signal suppression becomes so that the amplification factor of the tube is reduced, when the yaw signal increases solely due to a lowering in altitude.

The secret of the operation of this system just described is that the direct current voltage received from coil 31 will change very little solely for appreciable changes in yaw, and thus can be introduced into the yaw-indication circuit as discussed previously to decrease the magnitude of the yaw-induced voltages in such a way that the yaw angle can be determined with useful accuracy. The reason for the relative insensitivity of coil 31 is that its output changes with the cosine of the angle of yaw as distinguished from that of coil 82 which changes with the sine of the angle of yaw.

Clearly the auxiliary voltage derived from the coil responsive to the transverse field need not be applied to the tube grid exactly as pointed out, but may be used in other known ways by connection to the screen or plate circuits or otherwise so that the auxiliary voltage acts to partially block the amplification of the signal from the yaw-sensitive induction coil. The adjusting devices shown in the several circuits permit regulation so that the reading of the D.C. yaw meter does not change appreciably with distances (within the limits stated) vertically above the guide conductor. It is thus responsive principally to the angular yaw of the aircraft with respect to the projected plane defined by the position of the guide conductor, so that it leads to the measurement of the angle of yaw and not of the height of the aircraft above the excited guide conductor. The device can then be calibrated in terms of degrees.

Since the several inventions defined herein are of primary usefulness in connection with the flight of aircraft, the inventions have been so described, but it will be readily appreciated that they are of equal advantage, for instance, for the guidance of ships in harbors, bays, or rivers where fog makes visibility insufficient for visual navigation. With slight modifications such as the elimination of the coil 31, the device may also be useful in connection with the guidance of road vehicles. Since these would never vary substantially in height above the guide conductor, no adjustment would be necessary to insure proper operation of the yaw feature.

Ideally, one would like to have the guide conductor extend outward toward the approaching airplane in a straight line and at the same level as the touchdown point. Actual terrain seldom permits this, and the guide conductor lies above or below the ideal position. Clearly if the actual guide conductor is appreciably below the ideal level, more current should flow in this section of the conductor to bring the desired magnetic field to values characteristic of the ideal magnetic landing pattern. Conversely, if the conductor is above the ideal position, less current is required. Engineering this non-uniform distribution designed to compensate for irregularities of terrain is easily accomplished by the use of auxiliary transformers and/or conductors excited from the same power source or at least one of the same frequency and appropriate phase as used to excite the main guide conductor.

I claim:

1. A guidance system for vehicles including, in combination, means for generating a pattern of alternating magnetic flux at least within the audio range, induction means on a vehicle for sensing said flux as an A.C. voltage, means on the vehicle to rectify said voltage, means to indicate the phase direction of the flux from said rectified voltage, a conductor positioned above ground and within the influence of said pattern of A.C. magnetic flux, means energizing said conductor with a high A.C. voltage of the same frequency as said pattern, and means on the vehicle to detect the electrostatic flux from said conductor, said means to rectify said voltage sensed from the pattern flux being synchronized by the detected electrostatic flux to insure correct indication of phase.

2. The guidance system of claim 1 in which the generated pattern is a linearly extended one for aircraft landing guidance.

3. In a guidance system for vehicles, in combination, a guide conductor over which vehicles travel and a return circuit spaced sufficiently far apart to eliminate interference, means energizing said conductor with alternating current of such frequency as to cause only inconsequential phase displacement of the current throughout the conductor length, induction means on said vehicle for sensing the changing guide conductor flux, means for indicating the phase direction of the changing guide conductor flux, an unshielded second conductor adjacent said guide conductor and above ground level, means energizing said second conductor with a high A.C. voltage of the same frequency as that in the guide conductor, means on each vehicle to detect the electrostatic flux from said second conductor, rectifying means to rectify the voltage output of said induction means, and means energized by said detected electrostatic flux to synchronize the operation of said rectifying means with the current in the guide conductor.

4. The guidance system of claim 3 including means to indicate the phase direction of the flux from said rectified voltage.

5. In a system for providing guidance signals to a flying aircraft, in combination, means substantially at ground level for establishing a predetermined and uniform average level pattern of changing magnetic flux distributed along an extended guide path, means energizing said means with an alternating current of such frequency approximately within the audio range as to cause only inconsequential phase displacement of the current throughout the said path, means to establish an associated and similarly distributed pattern of synchronously changing electrostatic field from the said alternating current energizing means, inductor means on an aircraft for sensing the changing magnetic flux, antenna means on the aircraft for receiving the changing electrostatic field, a direct current device for indicating the phase direction of the current received by said inductor means, rectifying means for said current from said inductor and means actuated by the antenna output for synchronizing the rectifier output with the magnetic flux from said pattern.

6. Means for developing phase indicative signals on aircraft from an established ground level source of changing magnetic flux distributed along a guide path, comprising providing an above ground source contiguous to said first source of an electrostatic field synchronously changing in phase with the first source, a rectifier on said aircraft, a signal pickup on said aircraft for said magnetic flux, a signal pickup on the aircraft responsive to said electrostatic field, means supplying the rectifier with the output of said first pickup for rectification thereof, means supplying said rectifier with the output of said second pickup for synchronization of the rectifier output with the said changing magnetic flux, and a direct current meter energized by said rectifier output and indicative of the direction of direct current flow thereto.

References Cited by the Examiner

UNITED STATES PATENTS

| 1,968,068 | 7/1934 | Blancard et al. | 343—101.2 |
| 2,339,291 | 1/1944 | Paulus et al. | 340—4 X |
| 2,428,360 | 10/1947 | Dingley | 340—4 |

NEIL C. READ, *Primary Examiner.*

A. H. WARING, *Assistant Examiner.*